(12) United States Patent
Oehling et al.

(10) Patent No.: US 11,270,803 B2
(45) Date of Patent: Mar. 8, 2022

(54) SINGLE ROD ULTRASONIC LEAK DETECTION TOOL

(71) Applicant: WESTINGHOUSE ELECTRIC COMPANY LLC, Cranberry Township, PA (US)

(72) Inventors: Bryan R. Oehling, Greensburg, PA (US); James T. Polidora, North Huntingdon, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 565 days.

(21) Appl. No.: 15/903,111

(22) Filed: Feb. 23, 2018

(65) Prior Publication Data

US 2018/0261345 A1   Sep. 13, 2018

Related U.S. Application Data

(60) Provisional application No. 62/469,260, filed on Mar. 9, 2017.

(51) Int. Cl.
| | |
|---|---|
| *G21C 17/07* | (2006.01) |
| *G01N 29/27* | (2006.01) |
| *G01M 3/32* | (2006.01) |
| *G01M 3/24* | (2006.01) |

(52) U.S. Cl.
CPC ........... *G21C 17/07* (2013.01); *G01M 3/24* (2013.01); *G01M 3/3209* (2013.01); *G01N 29/27* (2013.01)

(58) Field of Classification Search
CPC ...... G21C 17/002; G21C 17/06; G21C 17/07; G21C 19/10; G21C 19/02; G21C 19/207; G01N 29/27
See application file for complete search history.

(56) References Cited

U.S. PATENT DOCUMENTS

| | | | | |
|---|---|---|---|---|
| 2,758,706 A | * | 8/1956 | Quinlan | G01N 29/27 414/432 |
| 3,415,111 A | * | 12/1968 | Chattaway | G01N 29/26 73/640 |
| 3,510,042 A | * | 5/1970 | Romere | G01N 27/82 226/177 |
| 3,561,258 A | * | 2/1971 | Ashford | G01N 29/27 73/622 |

(Continued)

FOREIGN PATENT DOCUMENTS

EP    0684612 A1 * 11/1995 ............ G21C 17/07

*Primary Examiner* — Sharon M Davis
(74) *Attorney, Agent, or Firm* — K&L Gates LLP

(57) ABSTRACT

The single rod ultrasonic leak detection tool will be used to detect leaking fuel rods by evaluation if there is water inside the rod. The test will be performed by moving one fuel rod between two ultrasonic transducer oriented in a pitch/catch configuration. The detection tool uses ultrasonic transducers as the primary method to detect leaking fuel rods. Two probes are preferably positioned near the fuel rod in a pitch/catch or transmitting/receiving configuration. One probe 36 sends the signal into the rod and the other probe of a set of probes receives the signal. An evaluation of the received signal is performed in various embodiments, to determine leak tightness of the fuel rod. In various aspects, two sets of probes may be utilized so that measurements can be taken on both sides of the fuel rod.

8 Claims, 14 Drawing Sheets

(56) References Cited

U.S. PATENT DOCUMENTS

| | | | | |
|---|---|---|---|---|
| 3,885,419 A | * | 5/1975 | Witte | G01N 29/26 |
| | | | | 73/600 |
| 4,605,531 A | * | 8/1986 | Leseur | G21C 17/06 |
| | | | | 376/251 |
| 4,696,784 A | * | 9/1987 | Tolino | G21C 17/06 |
| | | | | 376/245 |
| 5,066,452 A | * | 11/1991 | Hancock | G01N 29/26 |
| | | | | 376/240 |
| H1262 H | * | 12/1993 | Bacvinskas | G21C 17/06 |
| | | | | 376/252 |
| 5,790,617 A | * | 8/1998 | McClelland | G21C 17/06 |
| | | | | 376/252 |
| 2013/0058448 A1 | * | 3/2013 | Smith | G01M 13/028 |
| | | | | 376/245 |

* cited by examiner

SINGLE ROD ULTRASONIC LEAK DETECTION TOOL

BACKGROUND OF THE INVENTION

1. Field of the Invention

The present concept relates to methods for testing nuclear fuel rods, and particularly to methods for testing leaks in individual fuel rods.

2. Description of the Prior Art

In a typical nuclear reactor, the reactor core includes a large number of fuel assemblies, each of which is composed of a plurality of elongated fuel elements or fuel rods closed at each end with, for example, an end plug. The fuel rods each contain nuclear fuel fissile material, usually in the form of a stack of nuclear fuel pellets surrounded by a gas, such as helium (He). The fuel rods have a cladding that acts as a containment for the fissile material. On occasion, the metal fuel rod or the cladding may become weak or may crack or otherwise become damaged such that coolant, for example water, surrounding the fuel rods, leaks into the fuel rod and fissile material may leak out.

Fuel assemblies are constantly monitored for possible leaks by any of several methods. One commonly used method is referred to as "sipping." For example, a sample of water or air may be taken from the fuel assembly to measure by-products of fission. If a measurement indicates a leak, further testing to determine which of the hundreds of fuel rods (approximately 315) within a single fuel assembly is leaking. Currently, a system known as an automated fuel inspection tool (AFIS) is used to detect leaks in individual fuel rods. AFIS uses probes having ultrasonic transducers mounted to thin pieces of steel that pass between fuel rods within the fuel assembly. The fuel assembly is rotated to bring the rows of fuel rods positioned on the outer perimeters of the fuel assembly into proximity with the ultrasonic probes. However, the design of the fuel assembly does not allow the probes to evaluate the internal rods (approximately 120 rods) of the assembly.

There is a need for an improved method of testing for leaks in fuel rods that can test the internal rods.

SUMMARY OF THE INVENTION

The difficulty in testing internally positioned fuel rods for leaks with current testing methods can be overcome by the single rod leak detection tool described herein.

The detection tool uses probes, such as ultrasonic transducers, as the primary method to detect leaking fuel rods. Two probes are preferably positioned near the fuel rod in a transmitting/receiving configuration. One probe sends the signal into the rod and the other probe of a set of probes receives the signal. An evaluation of the received signal is performed in various embodiments, to determine leak tightness of the fuel rod. In various aspects, two sets of probes may be utilized so that measurements can be taken on both sides of the fuel rod.

The single rod leak detection tool may be designed as an add-on to existing testing equipment. In various aspects, the single rod leak detection tool may include an apparatus for detecting leaks in a fuel rod comprising a tool body having an upper end and a lower end and defining a bore extending from the upper to the lower end, the bore having in cross-section, a center line and being dimensioned for receiving and passing a fuel rod therethrough, at least one set of probes positioned in the tool body on each side of the bore, off-set a predetermined distance from the center line of the bore, and, an engagement surface for securing the lower end of the tool body to a surface.

The surface to which the apparatus is engaged may be a guide plate having a plurality of holes in a pattern aligning the holes with at least one section of fuel rods in a fuel rod assembly.

The surface may also be the surface of an existing tool platform to enable use of the apparatus with existing tools. The apparatus may, in various aspects, have two sets of probes, each set being positioned on opposite sides of the center line of the bore. Each set of probes may be positioned at a different elevation along the length of the bore. The probes may be positioned in close proximity but not in contact with a fuel rod when inserted into the bore. The apparatus may include a pair of pivot arms, one arm being mounted at a first end thereof to the upper end of the tool body and the other arm of the pair being mounted at a first end thereof to the lower end of the tool body, each arm having a second end having an opening therethrough, and a bolt passing through the openings of the second ends of the pair of pivot arms. The bolt may be adapted to be mounted on an existing tool platform to pivot the apparatus into and out of a working position on the existing tool platform.

The apparatus may also include a fuel rod centering mechanism to maintain the central axis of the fuel rod in alignment with the plane of the center line of the bore.

BRIEF DESCRIPTION OF THE DRAWINGS

The characteristics and advantages of the present disclosure may be better understood by reference to the accompanying figures.

DESCRIPTION OF THE PREFERRED EMBODIMENTS

Figure 1:
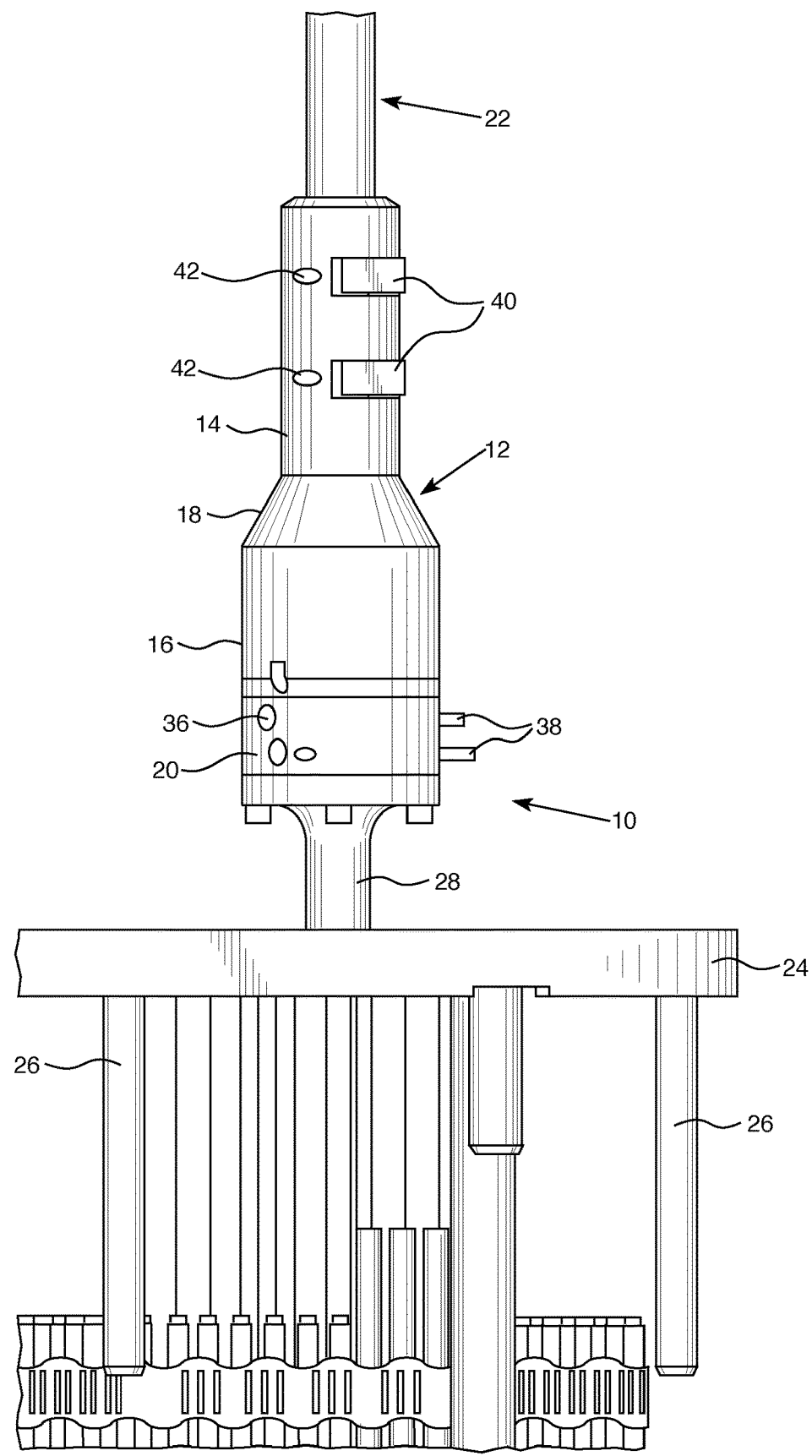
FIG. 1 is a side elevation view of an embodiment of a leak detection probe mounted in a tool body attached to a fuel rod handling tool.

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

When a fuel rod is cracked or otherwise damaged, water may leak into the rod. If a rod is full of water, or partially filled with water, there will be a difference in density from a measurement of a rod having no water present. Energy from a probe, such as an ultrasonic transducer, will be absorbed into the water and thus have reduced energy out of the rod to the receiving probe, or transducer. Before testing begins, the system would be initialized by comparing standards, such as signals produced when a rod is full of water and signals produced when a rod is full of gases and free of water.

An embodiment of a single rod leak detection tool 10 is shown in FIGS. 1-4. In certain aspects, the leak detection tool 10 includes a tool body 12 having a neck portion 14, a shoulder portion 18, and a trunk portion 16. The trunk portion 16 in the embodiment shown is larger in cross-section than the neck portion 14. The shoulder portion 16 may be in the form of a truncated cone or gradual slope leading from the neck 14 to the trunk 16. Positioned within the trunk portion 16 is a probe holder portion 20 and a secondary safety portion 48 configured to prevent the fuel rod handling tool collet tube from contacting the ultrasonic transducers. Bolts 44 connect the bottom end of the trunk portion 16, the probe holder 20 and top end of the trunk portion 16 together. Additional dowel pins (not shown) may be inserted in pin holes 46 that pass through the trunk portion 16 and probe holder 20. At least one and preferably two sets of probes 36 extend through the probe holder 20. Wires 38 (shown in part for convenience) extend from the probes 36 to a power source (not shown). Under the trunk portion 16 of the tool body 12 is a narrow engagement shaft 28 dimensioned to be seated in a hole 30 in a guide plate 24.

Figure 2A:
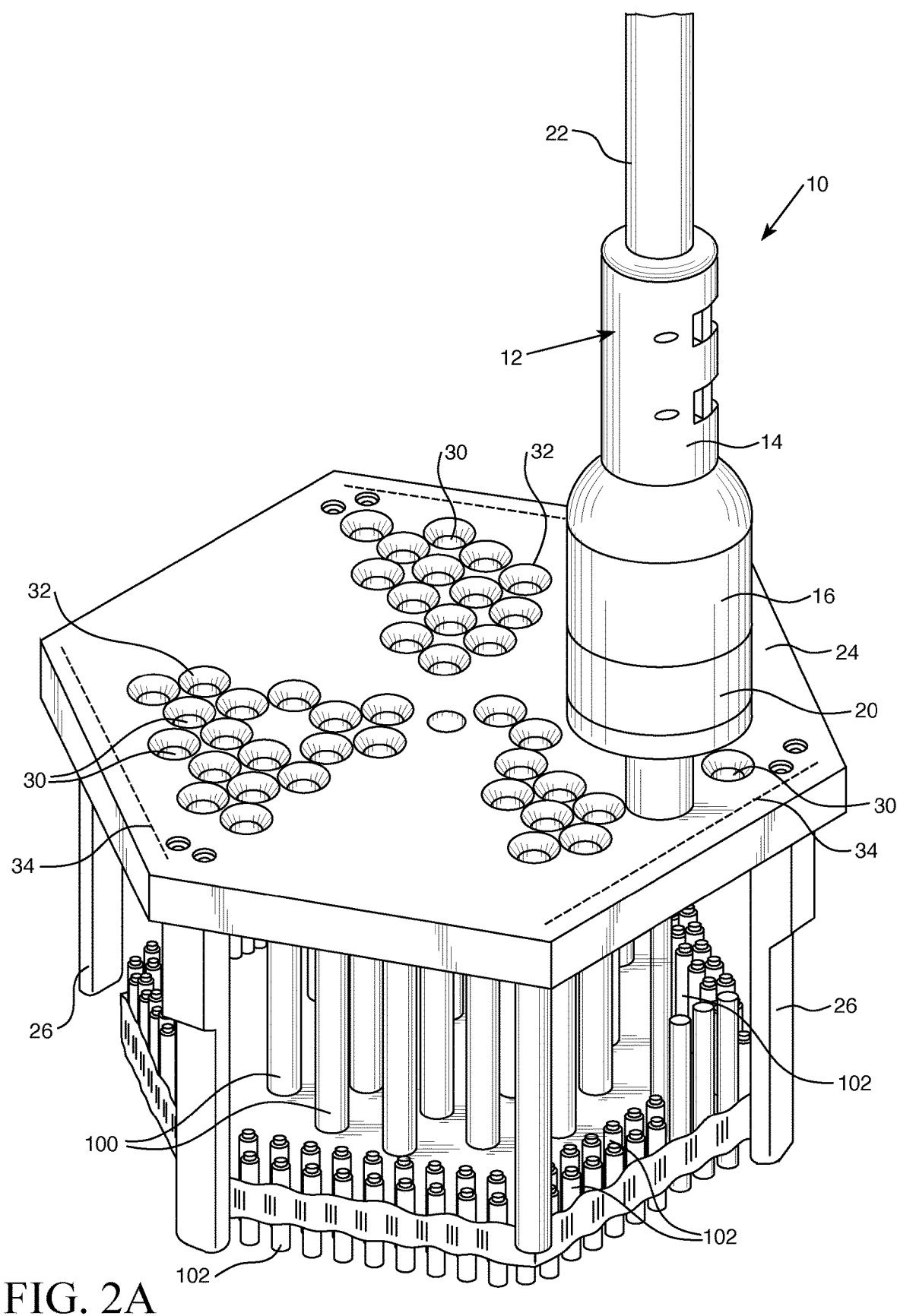
FIGS. 2A and B are views of the leak detection probe of FIG. 1 mounted on a guide plate above a fuel rod assembly.
Figure 2B:
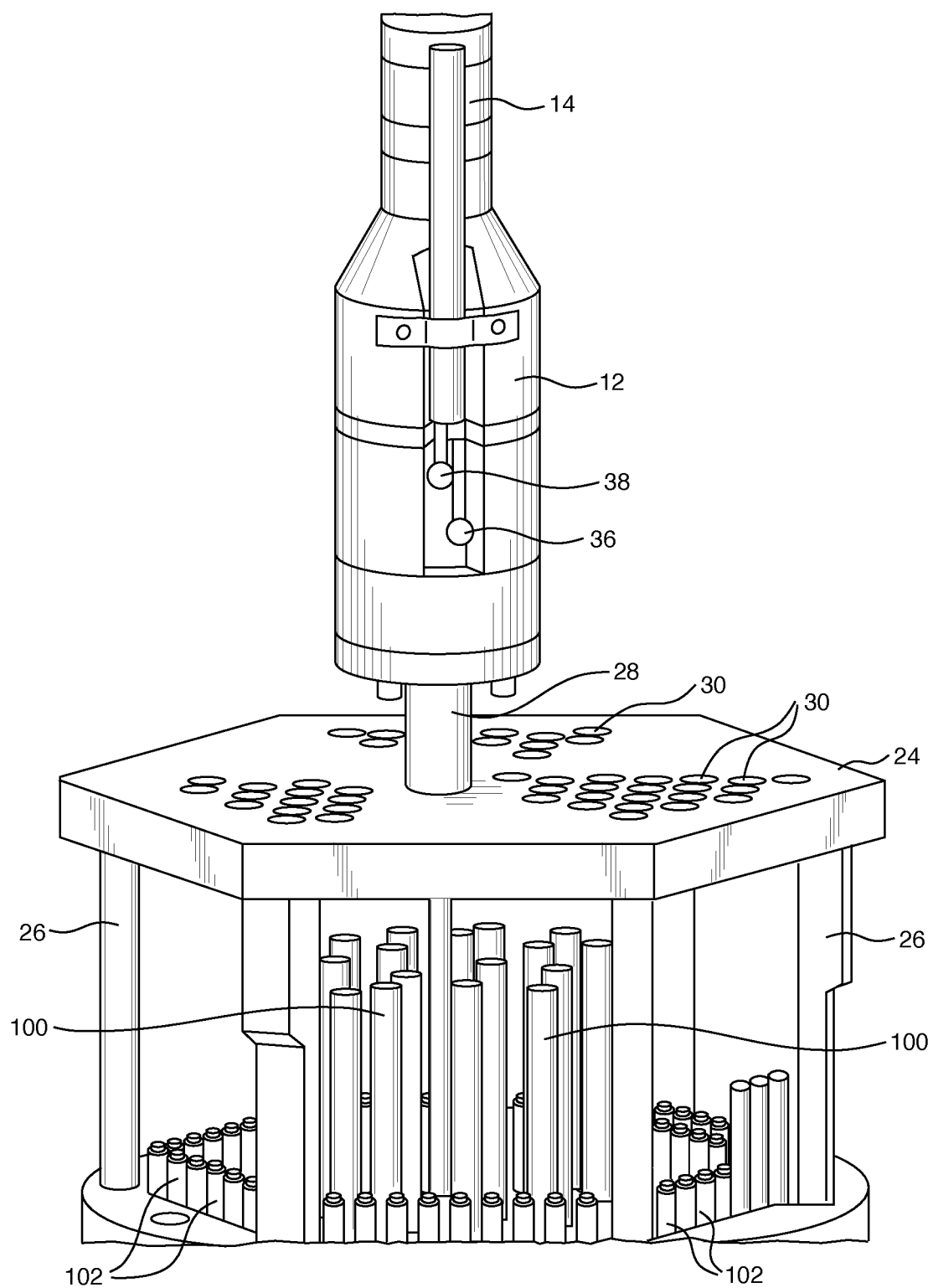
FIG. 2C is a cut-away view showing an embodiment of the guide plate mounted on a top grid of a fuel rod assembly.
Figure 2C:
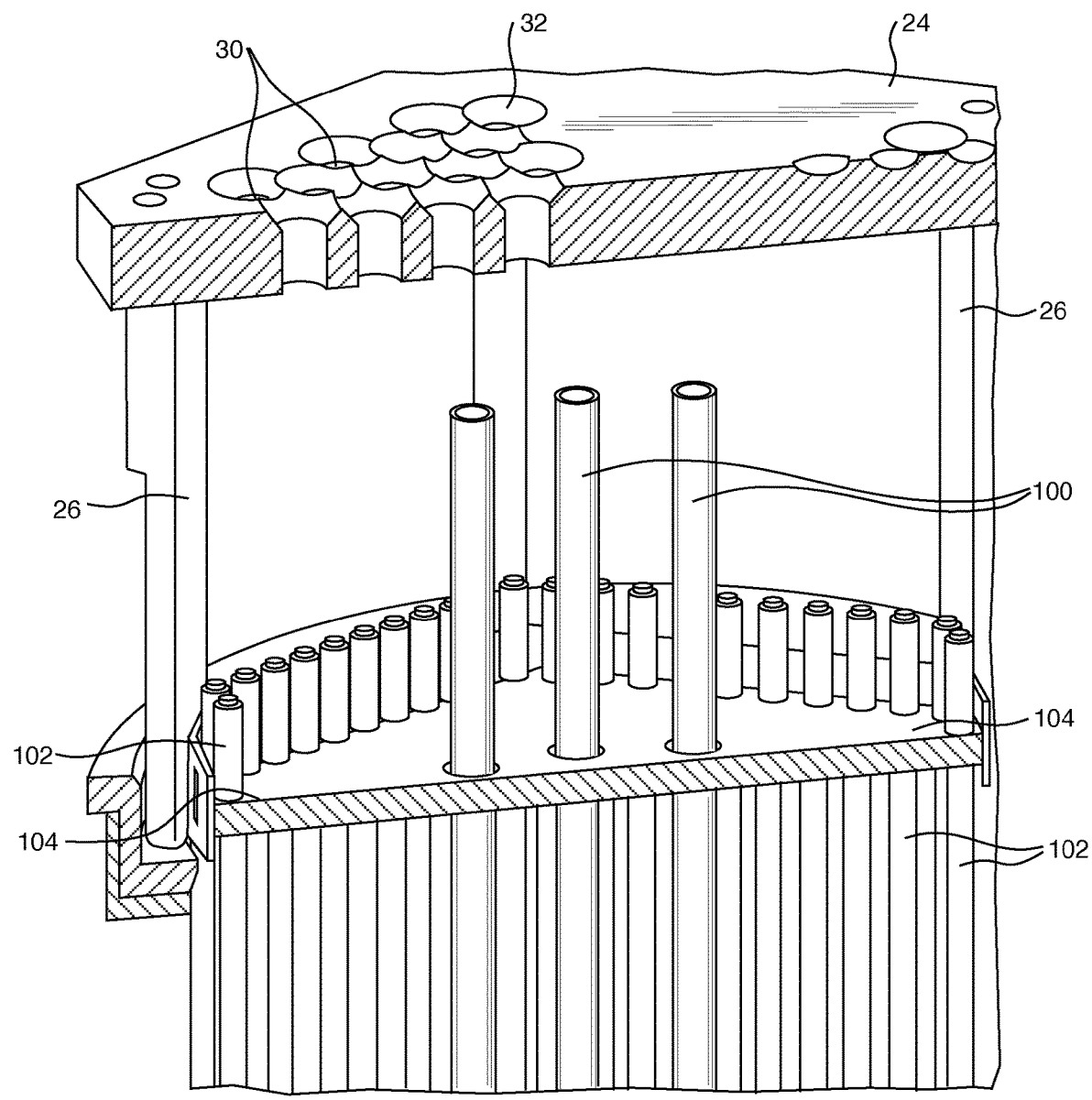

As shown in FIG. 2, guide plate 24 is dimensioned to sit above the top grid 104 of a fuel assembly following removal of the top nozzle (not shown) to allow removal of a fuel rod 102. As shown in FIG. 2C, guide plate 24 may also have support legs 26 that engage with the top grid 104 of the fuel assembly in use in this part of the fuel rod removal process. The guide plate 24 as shown has a plurality of holes 30 with leading chamfered 32 openings to receive the engagement shaft 28 of the leak detection tool 10. The chamfered openings may guide the shaft 22 of a fuel rod handling tool and the engagement shaft 28 of the tool body 12 easily into holes 30. The guide plate 24 aligns the fuel rod handling tool shaft 22 with individual fuel rods 102 beneath the guide plate 24. On the face of the guide plate 24 are indicators or symbols, for example, alpha-numeric symbols 34, to align the hole 30 and the shaft 22 when inserted in the tool body 12 with a specific fuel rod 102 based on the position of the fuel rod 102 in the fuel assembly. When removing a fuel rod, particularly for leak testing, it is important to know the position of the rod 102 so that it or a replacement can be returned to the correct position and to track which rods 102 have been tested. The guide plate shown has three sections of holes 30 so that the guide plate can be rotated in one of three positions to move the sets of holes into alignment with different sets of fuel rods. One guide plate is designed to be able to align with every other fuel rod. A second guide plate may be provided having similar patterns of holes, but positioned to align with the fuel rods not reachable with the first guide plate 24. The second guide plate, also rotated to one of three positions, is preferably identified with different numbering and also marked with a set of alpha-numeric symbols to appropriately align with and identify the fuel rod to be removed for testing.

Figure 3A:
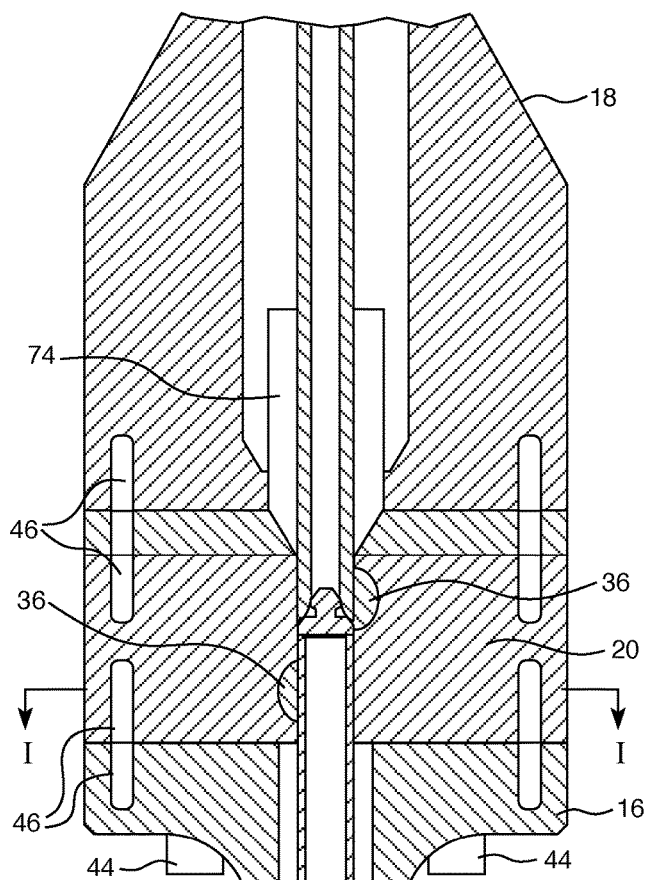
FIGS. 3A and B illustrate (A) a section view of a portion of the leak detection probe of FIG. 1 and (B) a cross-section of the probe and probe holder through the line I-I of FIG. 3A, showing the off-set position of one set of ultrasonic probes relative to a fuel rod being tested.
Figure 4:
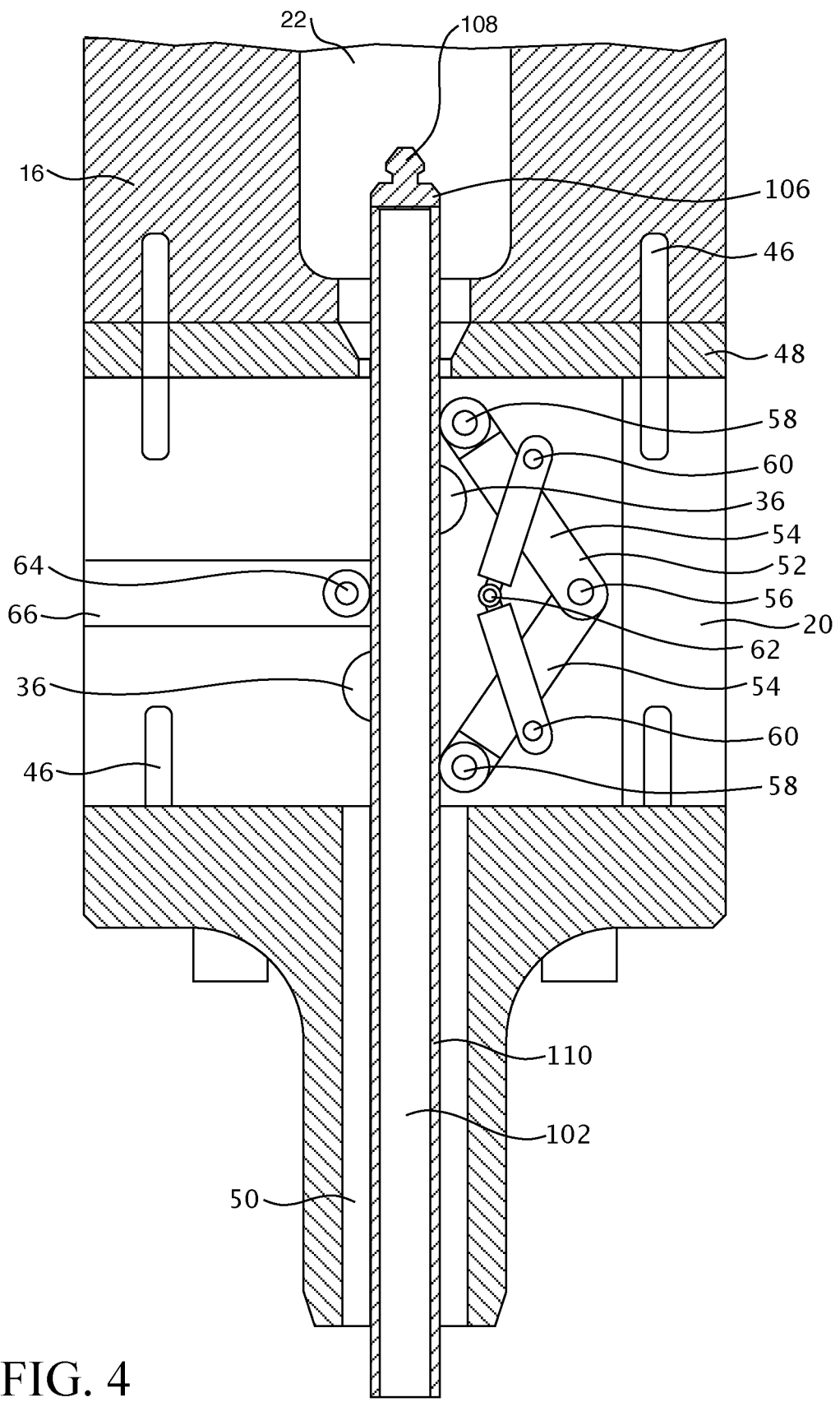
FIG. 4 is an embodiment of the portion of the leak detection probe of FIG. 3A having a rod centering mechanism.
Figure 6:
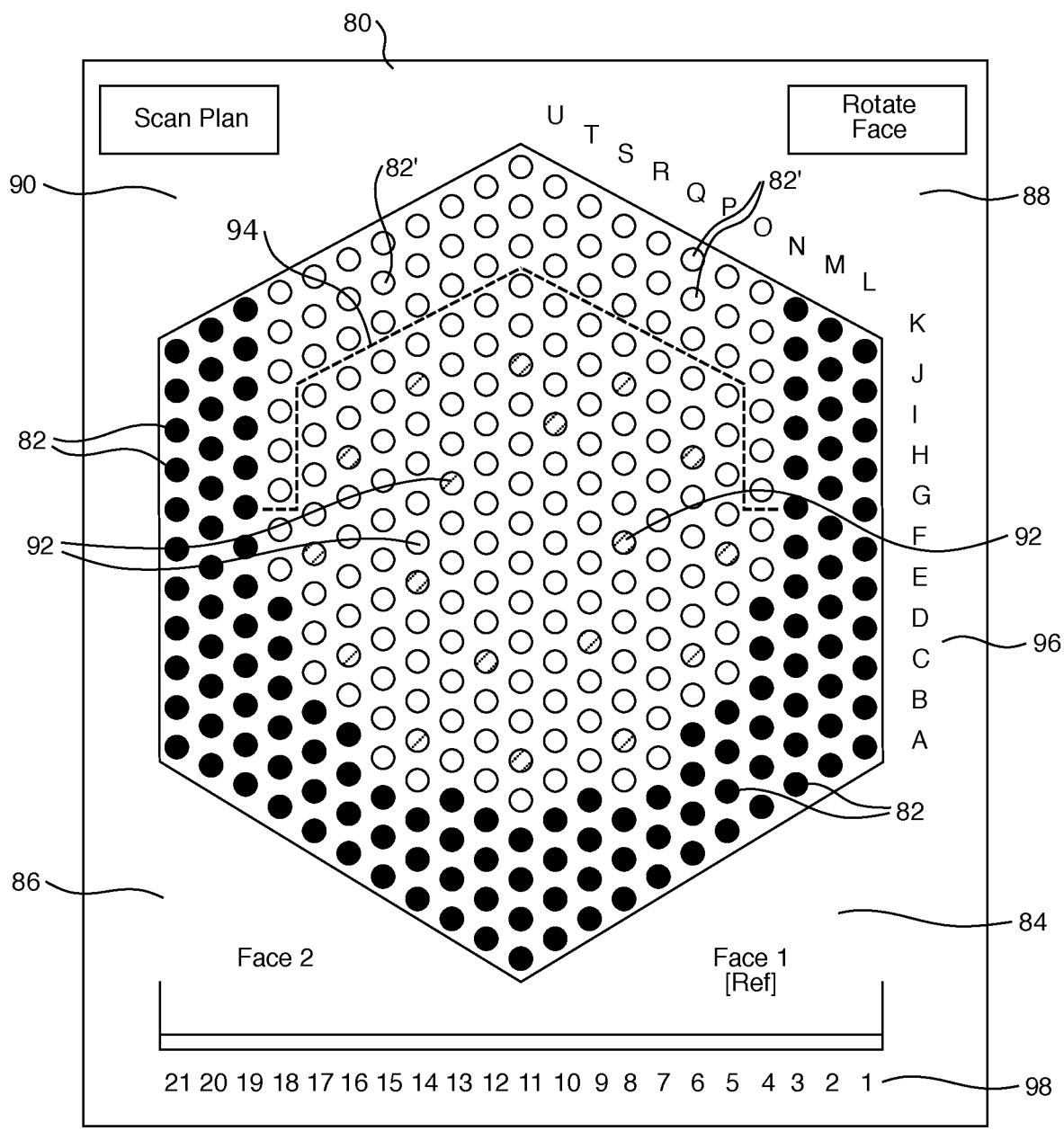
FIG. 6 is an automated fuel inspection (AFIS) scan showing the alpha-numeric positioning of fuel rods in a fuel assembly; e.g., a rod positioned along an alpha row and a numeric column, such as rod A1 or D14. The rows of dark filled circles along the perimeter indicate fuel rods accessible by the conventional AFIS leak detector in a first position. The open circles along the perimeter behind the dashed line indicate the fuel rods accessible to the conventional AFIS leak detector when the AFIS detector approaches the fuel assembly from a second position. The open circles and lightly filled circles inside the dashed line and the dark-filled circles indicate those fuel rods that are not accessible for testing with the conventional AFIS leak detector but which are able to be tested using the single rod leak detector described herein.

The alpha-numeric scale used on first and second guide plates 24 is coordinated with, or matches, the alpha-numeric scale on a scan 80 of an array of fuel rods 102 in a fuel rod assembly. Referring to FIG. 6, a scan 80 of a fuel rod assembly, illustrating the position of fuel rods 102 in the assembly is shown. The fuel rods 82 illustrated by dark filled circles on the outer perimeter rows are accessible by ultrasonic probes in known leak detection tools positioned near the Face 1 (84) and Face 2 (86) quadrants. The fuel rods 82' illustrated by the rows of open circles from the perimeter of the scan to the dashed line 94 are accessible by the ultrasonic probes of known leak detection tools when the probes are rotated to the opposite side of the fuel rod array to detect faces 3 and 4 in quadrants 88 and 90, respectively. The fuel rods 92 in the internal portion of the array are not accessible with conventional leak detection tools. The single rod leak detection tool 10 described herein may be used to detect leaks and perform other testing, depending on the nature of the probes 36 used, of fuel rods 102 for all of the fuel rods 102 in the internal portion and on the perimeter of the array. For convenience and timing, it may be useful to employ both the conventional leak detection tools for the perimeter and the single rod leak detection tool 10 for the internally positioned fuel rods 102. The scan 80 includes alphanumeric designations to mark the position of individual rods 102 in the array of rods in a fuel assembly. A numeric scale 98 is shown along one edge of the scan 80 and an alpha scale 96 is shown along two of the six sides of the fuel rod array. As shown in FIGS. 3A and 4, there is a passage 50 that extends through the central longitudinal axis of the tool body 12. The lower end of the passage 50 in the engagement shaft 28 and a portion of the passage 50 through the probe holder 20 are dimensioned to receive a fuel rod 102 to be tested. The upper end of the passage 50 in the trunk portion 16 and the neck portion 14 of the tool body 12 receives a shaft 22 of a conventional fuel rod handling tool. A centering bushing 74 is positioned in the upper end of the passage 50 in trunk portion 16 just at the juncture with probe holder 20 to keep the grippers 70 centered about fuel rod 102 end plug 106.

Figure 3B:
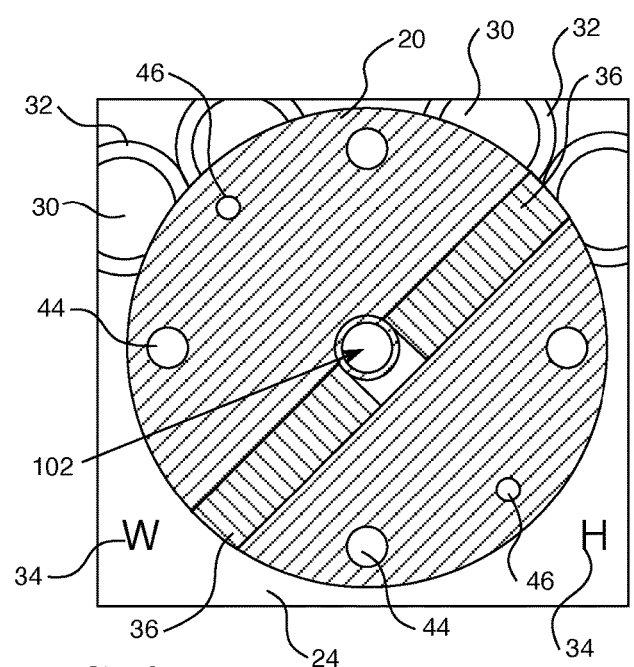

FIG. 3B is a cross-section through the line I-I of FIG. 3A showing the arrangement of the probes 36 in a set of two probes on each side of a fuel rod 102 inserted into passage 50 in the center of probe holder 20. As shown in FIG. 3A, there may be two sets of probes 36. Each set is off-set at an equal or substantially equal distance from the center line of fuel rod 102 but on opposite sides of the fuel rod center line so that the ultrasonic transducers of the probe 36 transmit and receive signals at the optimum spot on the fuel rod 102. A first set of probes may be positioned such that the probe signals strike and are emitted from, for example, the first and second quadrants of the fuel rod (see the schematic in FIG. 9). A second set of probes 36 may be positioned such that the probe signals strike and are emitted from, for example, the third and fourth quadrants of the fuel rod (see the schematic in FIG. 9).

Referring to FIG. 4, a rod centering mechanism 52 may be provided in certain aspects to maintain the fuel rod in alignment with a single plane. Signal quality of the ultrasonic transducers is susceptible to movement of the rod 102, so maintaining alignment is best for optimum results. In various aspects, the centering mechanism may include roller guides, such as those shown as rollers 58 and 64. In various aspects, the centering mechanism may include movable arms 54 joined at one end by a pivot joint 56 and having rollers 58 on each free end of the arms 54. A spring 62 secured to each arm 54 by an anchor pin 60 biases the rollers 58 against the fuel rod 102. On the opposite side of fuel rod 102, a stationary roller 64 on a stationary arm 66 provides the countering force to center the fuel rod 102 within passage 50.

Figure 5:
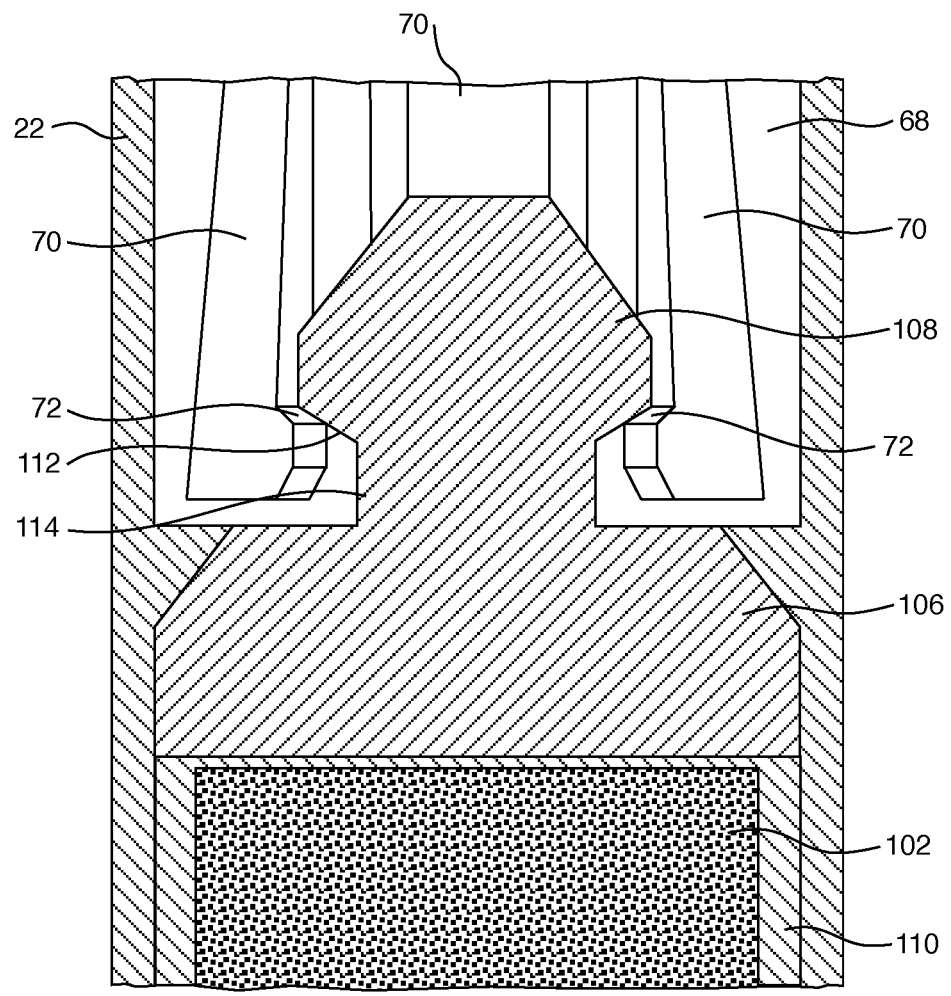
FIG. 5 is a close-up side sectional view of an embodiment of an end plug on a fuel rod engaged with a gripper section of a fuel handling tool.

Fuel rods 102 generally comprise a rod cladding 110, end plugs 106 and house fissile material within the rod 102. The end plug 106 may be provided with an upper button or knob 108 to allow the fuel rod 102 to be grasped by a fuel rod handling tool. Fuel rod handling tools are known in the art and used to remove a single fuel rod from a fuel rod assembly. FIG. 5 illustrates the features of a fuel rod handling tool that may be used to remove the fuel rod 102 from the fuel assembly. The shaft 22 of the fuel rod handling tool is an open lumen through which a retractor 68 having grippers 70 configured to grasp and hold the button 108 of an end plug 106 of the fuel rod 102 may be inserted to remove the fuel rod 102 from the fuel assembly. The retractor 68 may include, in various aspects, at least two and preferably three or four grippers 70 having ends 72 configured to may grasp the contours of the end plug button 108. As shown in FIG. 5, the button 108 may have a beveled surface 112 leading to a neck portion 114. The ends 72 of the grippers 70 may be configured to complement the shape of the button 108 bevel surface 112 and neck 114 to grasp and hold the button 108 and thereby the fuel rod 102 as the rod is removed from the fuel assembly.

Figure 7:
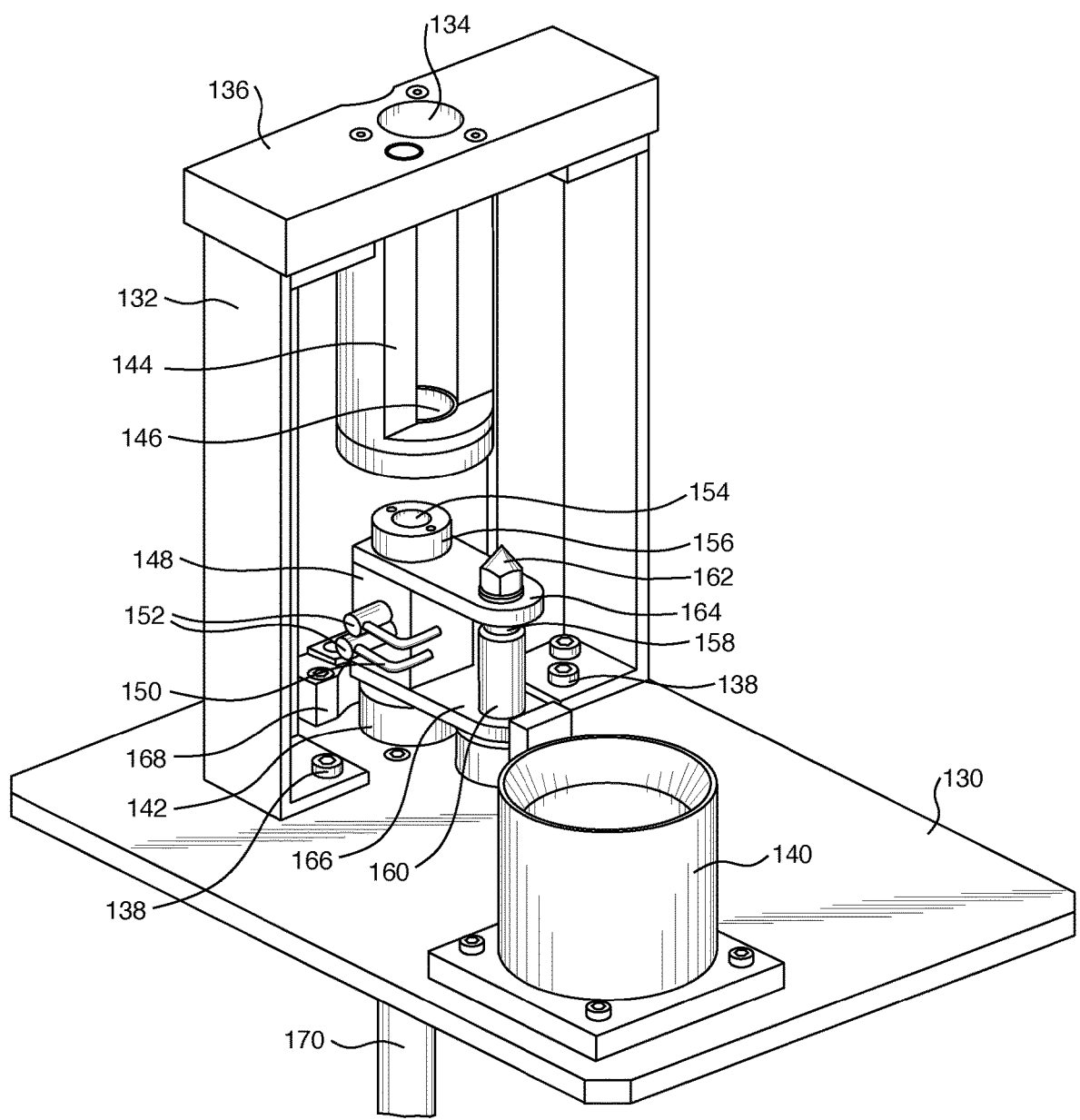
FIG. 7 is a perspective view of an alternative embodiment of a single rod leak detection tool mounted on a conventional visualization stand.
Figure 8:
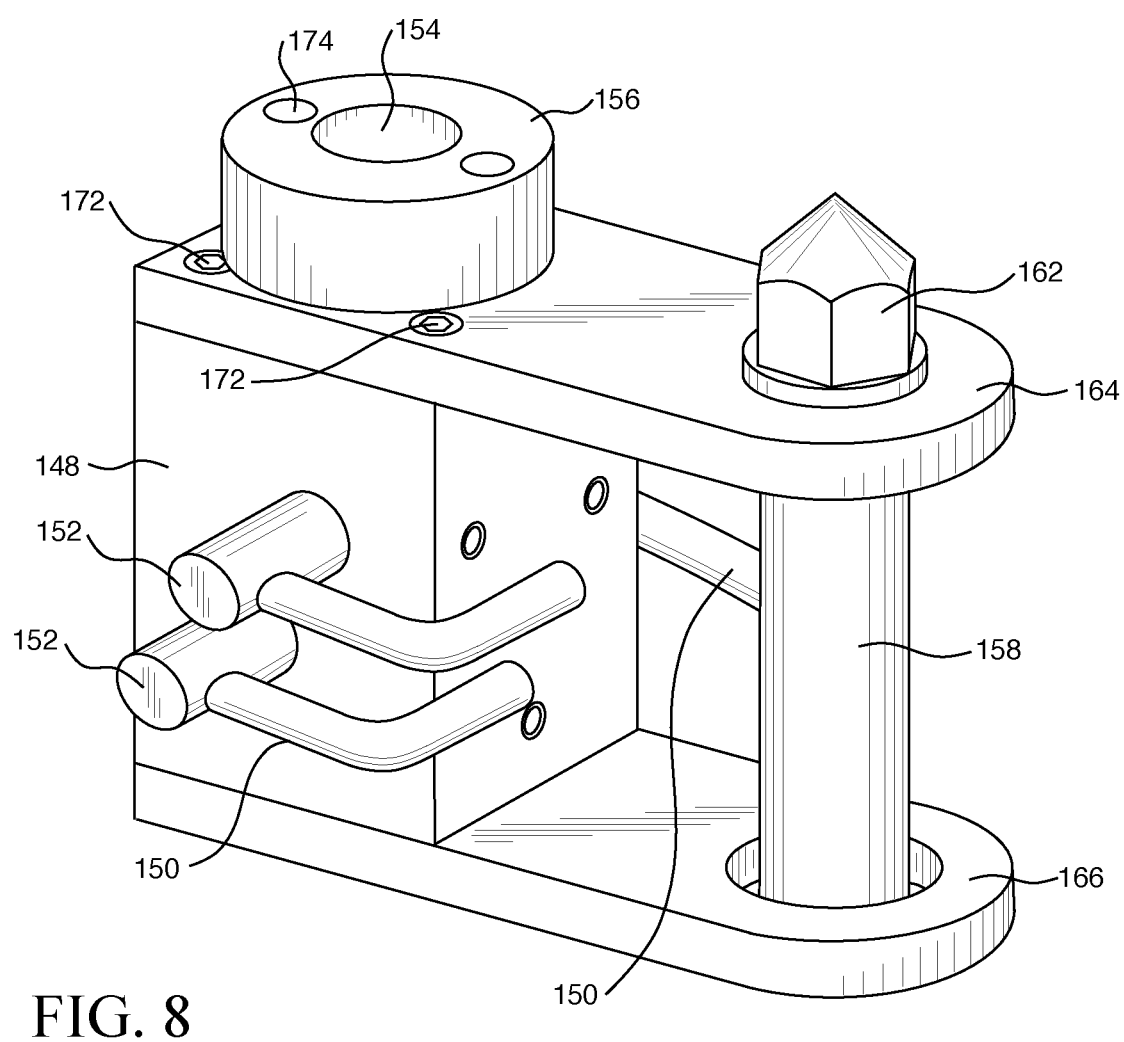
FIG. 8 is a close-up perspective view of the single rod detection tool of FIG. 7.

In an alternative embodiment, the single rod leak detection tool 10 may be designed as an add-on to existing testing equipment. In this aspect, the fuel rod to be tested is removed from the fuel assembly and taken to another test stand location. As shown in FIGS. 7 and 8, a probe holder 148 may, in various aspects, be positioned between top and bottom arms 164 and 166, respectively, secured by suitable fasteners, such as bolts or screws 172. An alignment collar 156 having opening 154 to an axially aligned passage through probe holder 148 is mounted on top arm 164. Bottom arm 166 is positioned over, but not affixed to, a lower alignment collar 142. Probes 152 are housed in holder 148 and, like probes 36, have wires 150 electrically connected to a power source (not shown) and preferably a known computer or other known processing unit (not shown). A bolt or shaft 158 functions as an axis of rotation for the probe holder 148 relative to the mounting plate 130 of an existing testing platform, such as a single rod visual stand. The bolt 158 extends through top arm 164 and bottom arm 166. The bolt 158 is fixedly mounted to plate 130, and is generally covered in part by a sleeve 160 attached to bottom arm 166 to allow the bolt 158 to rotate within the sleeve. A nut, such as hexagonal nut 162 secures the bolt 158 to top arm 164. Hexagonal nut 162 is configured to mate with a tool (not shown) to rotate holder 148 out of alignment with a passage for receiving a fuel rod 102 when the existing testing equipment is needed for other testing. For example, a holder 140 for a camera (not shown) is mounted on plate 130 when the tool is used to photograph sections of a fuel rod 102 for visual inspection and records.

A frame 132 is mounted by bolts 138 or other suitable fasteners to plate 130. Frame 132 includes a top cross bar 136 with a funnel shaped hole 134 through it to receive a single fuel rod 102 for desired testing. A guide cage 144 is suspended from top cross bar 136. Cage 144 has a passage 146 in axial alignment with funnel opening 134 and opening 154 in an alignment collar 156 on probe holder 148 when it is rotated into position under cage 144. Like probe holder 20, probe holder 148 includes a through passage for receiving a fuel rod 102. At least one, and preferably two, sets of probes 152, preferably ultrasonic transducers, pass through holder 148 and like probes 36, are positioned slightly off-set from the center line of the fuel rod for optimum signal processing. When two sets of probes 152 are used, each set is positioned on opposing sides of passage 146, so that one transducer is positioned adjacent and in close proximity to each quadrant of the fuel rod so that measurements can be taken from both sides of the fuel rod as the rod is moved longitudinally along the length of the probe holder 148 past the probes into the shaft 170 beneath plate 130. A safety feature in the form of member 168 is positioned behind alignment collar 142 on plate 130 to keep the rod in place in the event that a fuel rod 102 breaks during testing. The member 168 can be used to remove the shaft 170 and rod 102 as a unit.

In use, a fuel rod 102 to be tested for a leak will be removed from the fuel rod assembly using a known fuel rod handling tool such as that shown in part in FIGS. 1, 2 4 and 5. As shown in FIG. 2, a guide plate 24 will be positioned over the top grid 104 of a fuel assembly and the holes 30 of the guide plate rotated so that they align with a section of fuel rods to be tested. If leak detector 10 having tool body 12 with probe holder 20 is used, the engagement shaft 28 of the tool is secured to the appropriate hole 30 to align with the particular fuel rod in a specific position in the array of rods. Passage 50 of the tool body aligns axially with hole 30 on the guide plate 24. The shaft 22 of a fuel rod handling tool will be passed through the passage 50 and hole 30 to reach the top end plug of the desired fuel rod 102. As shown in FIG. 5, a retractor 68 may be inserted through a shaft 22 in the handling tool and used to grasp the button 108 on the top end plug 106 of the fuel rod 102 to pull the rod out of the fuel assembly. As shown in FIG. 3A and FIG. 4, the fuel rod 102 will be pulled past the sets of ultrasonic transducers 36. An ultrasonic signal will be transmitted from one ultrasonic transducer within the set of probes to the metal rod 102 and after a period of time, a signal will be received or captured by the other ultrasonic transducer within the set of probes. The signals will be transferred to a computer for processing and eventual display on a user interface module.

If the embodiment of the leak detection tool as shown in FIGS. 7 and 8 is used, the rod handling tool will be used to remove a single fuel rod as described above, without the engagement shaft 28 of the leak detection tool. The fuel rod will be passed through funnel 134, through cage 144 and passage 146, through opening 154 in alignment collar 156 through a passage in probe holder 148 through lower alignment collar 142 and then through an opening in plate 130 to a shaft 170 under plate 130 for receiving the fuel rod 102. The ultrasonic transducers 152 in holder 148 will transmit an ultrasonic signal to the rod 102, and after a period of time, a signal will be emitted from the rod 102 to the receiving probe of the set of probes 152, and transferred to a computer for processing and eventual display on a user interface module.

Figure 9:
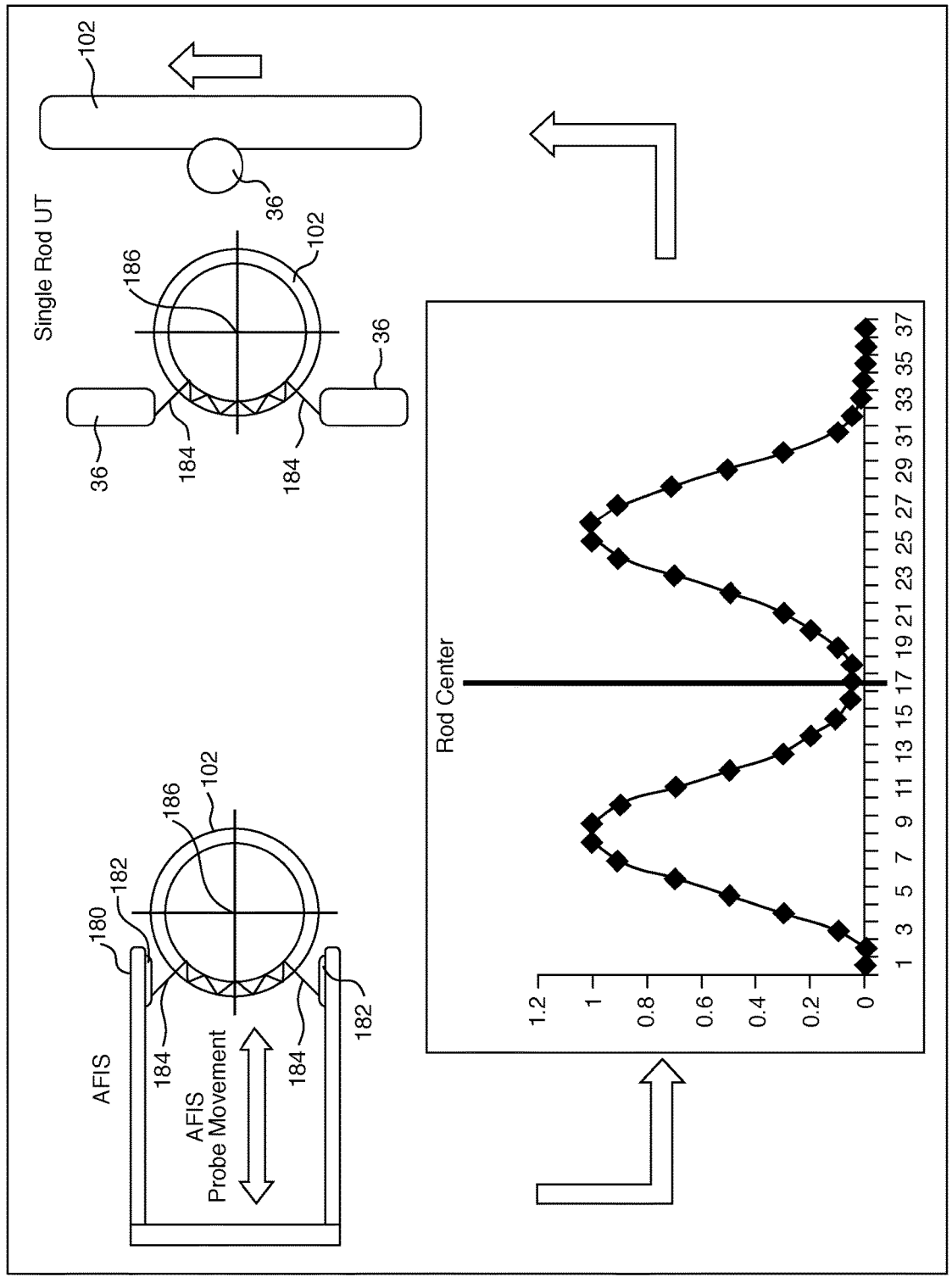
FIG. 9 is a schematic illustration comparing the signal output from an AFIS leak detector measuring the ultrasonic signal from a fuel rod with the anticipated signal output from an embodiment of the single rod leak detector measuring the ultrasonic signal from a fuel rod.

FIG. 9 shows an existing leak detection tool 180, referred to as AFIS, having opposing wall sections that may be moved back and forth, as indicated by the arrow in the figure, to bring the probes into alignment with fuel rods in place in a fuel rod assembly. The probes may be ultrasonic transducers 182 which are moved into position on each side of a fuel rod 102 such that the transducers are off-set from the center line 186 of the rod 102. Signals 184 are transmitted from one transducer 182, pass through the metal rod 102 and are received by the second transducer 182 is the pair of transducers. A graph of the amplitude of the signals detected from rod 102 are shown. The optimum amplitude reading for an intact fuel rod 102 may be, for example, set at 1 or any arbitrary setting determined to consistently provide the optimum signal based on standards used. When the transducers take measurements at the center line 186 of the rod 102, the signal is not optimum. The X axis of the graph represents the distance of the probe position from the center line of the fuel rod. Signals are measured at intervals, for example, every 0.02 inch, to show the location where the amplitude reading is highest, or optimum at 1.0 in the exemplary graph signals shown. In the graph shown, the optimum distance is set at 9. In various aspects, ultrasonic transducers may be placed at $\frac{1}{8}^{th}$ inch off set (e.g., to the left or the right) from the center-line of the fuel rod and from about $\frac{1}{4}$ to $\frac{1}{2}$ inch away from the fuel rod to avoid having the probe touch the fuel rod, for good signal output. Depending on the size and material of the rod, the distance of the probes from any specific fuel rod of various different fuel rod assemblies may differ. Those skilled in the art can readily determine the optimum distance by initializing with standards consistent with the fuel rod assembly to be tested.

FIG. 9 also shows a schematic representation of the single rod leak detection tool described herein. Two ultrasonic transducers may be used as the probes in a set of probes 36 and are placed on each side of a fuel rod 102 such that the transducers are off-set from the center line 186 of the rod 102. In the single rod leak detection tool described herein, the fuel rod is moved past the stationary probes, whereas in the AFIS tool, the probes are moved past the fuel rod. Signals 184 are transmitted from one transducer 36, pass through the metal rod 102 and are received by the second transducer 36 in the pair of transducers. When the transducers are placed in close proximity to the fuel rod, but not in contact with the fuel rod and off-set from the center line 186, for example, in alignment generally with the first and second quadrants of the fuel rod, using the X and Y center lines as quadrant boundaries, the transducer signal detection has been determined to be optimum. For optimum results, the signal measurements from the single rod leak detection tool should be consistent with the signal measurements of the existing leak detection tools. The probes 36 or 152 should be positioned such that a non-leaking, intact fuel rod has an amplitude that is the same as a similar reading from the existing leak detection tools, such as the schematic of the AFIS tool shown in FIG. 9.

Figure 10:
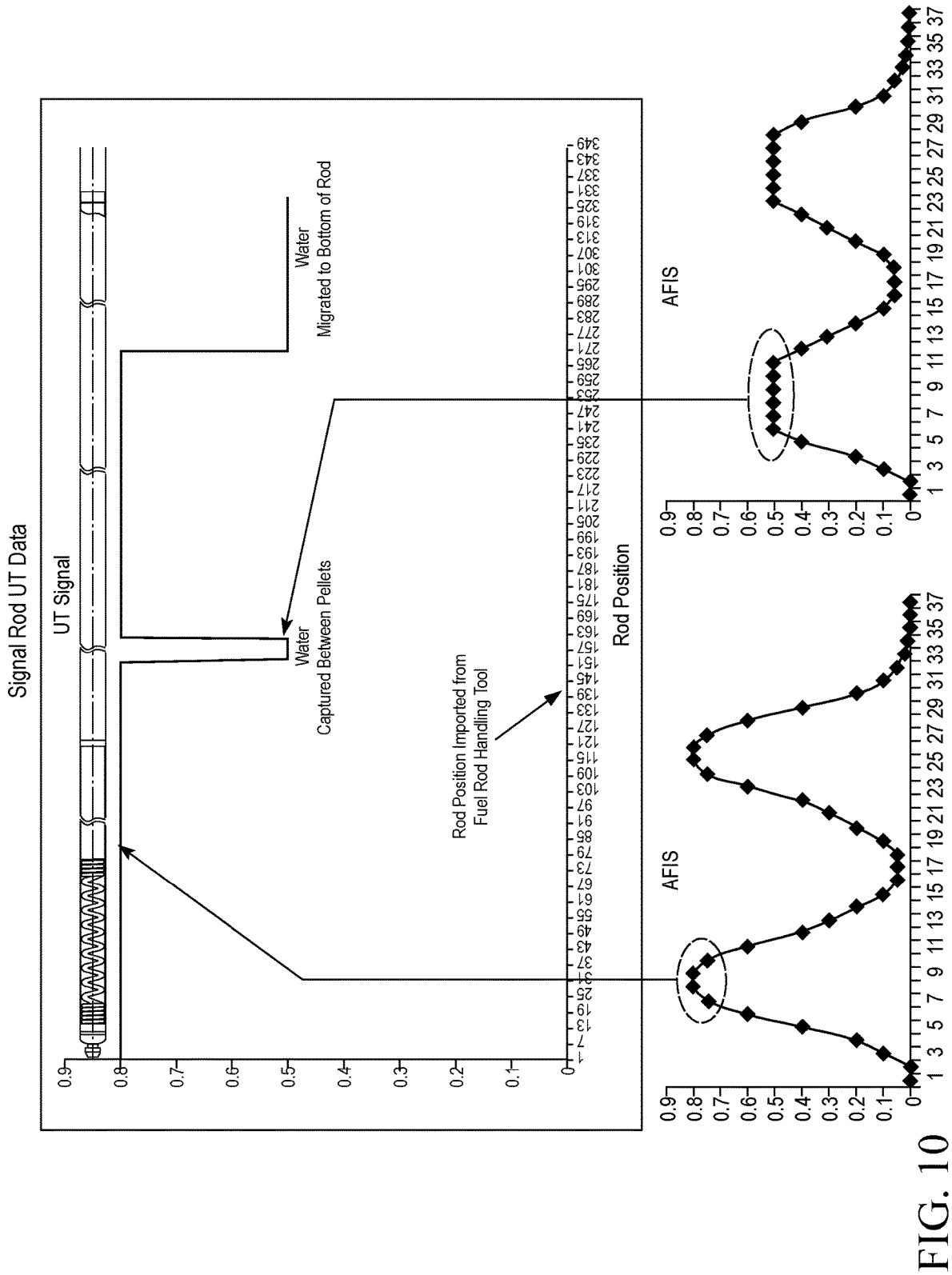
FIG. 10 represents a comparison of readings from AFIS leak detectors to an embodiment of a reading from a single rod leak detector, showing examples of an intact fuel rod (peak at 0.8) and a leaking fuel rod (peak at 0.5) in the AFIS graphs to steady state lines at 0.8 and decreases in amplitude at 0.5 in the single rod leak detector.
Figure 11:
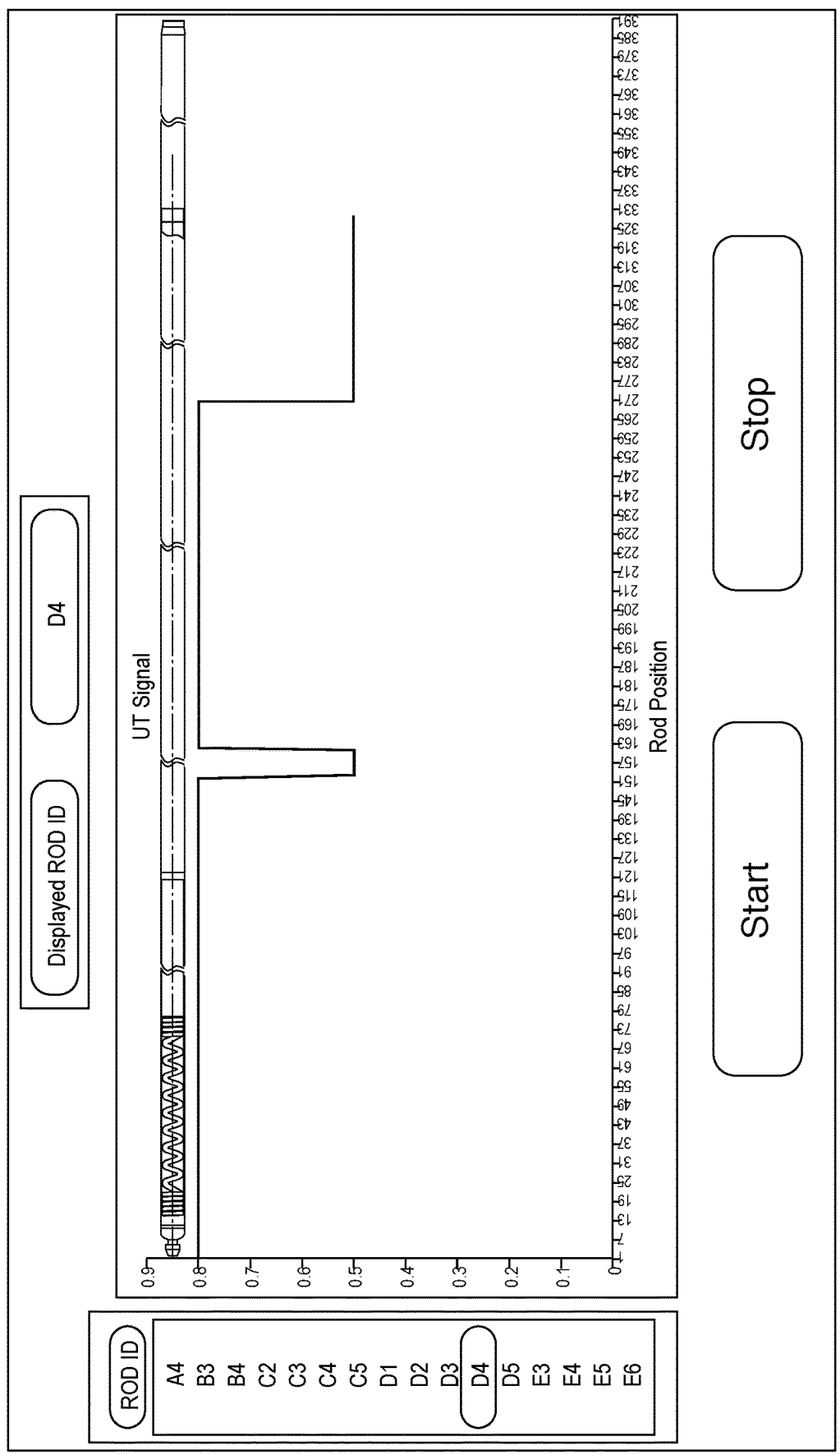
FIG. 11 represents an embodiment of a user interface display of a single rod leak detector showing the reading for an individual fuel rod taken from the position D4 using the alpha-numeric scan positions of FIG. 6 to identify the rod being tested, showing areas of weakness.
Figure 12:
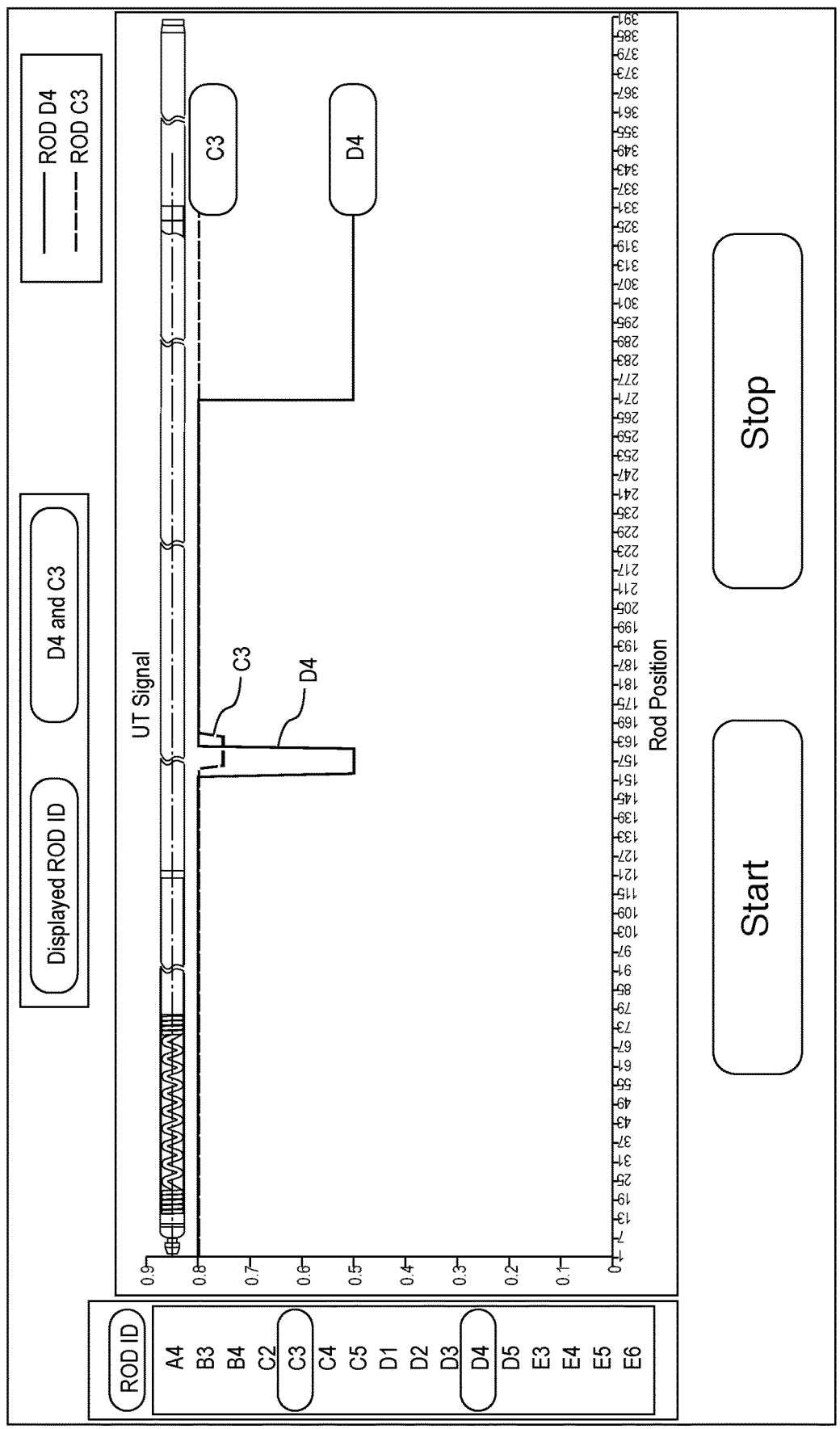
FIG. 12 represents an embodiment of a user interface display of a single rod leak detector showing a comparison of the readings for two fuel rods taken from the C3 and D4 positions.

FIG. 10 illustrates readings from existing AFIS leak detection tools showing an intact, non-leaking rod and a leaking rod where the amplitudes are 0.9 and 0.5, respectively. These AFIS readings are compared to a user interface reading using the single rod leak detection tool described herein. FIG. 11 illustrates a reading from the single rod leak detection tool of a single rod, taken from position D4 in the guide plate and rod scan arrays, the sections of the rod where the amplitude indicated a leak. At the top of the screen there is an image of a fuel rod showing the portion of the fuel rod corresponding to the signal readings in the graph below the fuel rod image. FIG. 12 illustrates an overlay of readings from the single rod leak detection tool comparing readings taken from two single rods, at different times, taken from positions D4 and C3 in the guide plate and rod scan arrays. If a reading is good, indicating no water present in the rod, the amplitude will be constant and appear as a continuous line at the reading set by standards for a rod free of water and filled only with the desired gas, 0.8 in the screen shown. If water is present, the amplitude will decrease where the transmission was weaker and/or took longer, consistent with standards initialized for a rod full of or partially full of water, for example, 0.5 in the screen shown for rod D4.

The single rod leak detection tool 10 in various embodiments, will be secured to the bottom end of a fuel rod handling tool 22, allowing for inspection during the rod 102 removal process. The leak detection tool 10 preferably has the same bottom interface geometry as the fuel inspection and repair equipment to ensure that the leak detection tool 10 engages with the fuel rod storage basket, single rod visual stand 130, and the fuel rod guide plates 24. The main body of the detection tool 10 may be made of stainless steel or any suitable material that will not react with the fuel rod cladding.

The detection tool 10 uses ultrasonic transducers 36 as the primary method to detect leaking fuel rods. Two probes 36 are preferably positioned near the fuel rod 102 in a pitch/catch or transmitting/receiving configuration. One probe 36 sends the signal into the rod 102 and the other probe of a set of probes receives the signal. An evaluation of the received signal is performed in various embodiments, to determine leak tightness of the fuel rod. In various aspects, two sets of probes may be utilized so that measurements can be taken on both sides of the fuel rod. The ultrasonic signal acquisition and review will be conducted with the assistance of a computer program that allows for recording of critical data like operator name, time of measurement, and rod identification. Data can be saved on standard media devices and reviewed at a later time.

The proposed tooling concept could be configured for two different methods of fuel rod inspection. For example, the single rod inspection tool may, in various aspects, include an eddy current flaw detection component. The inspection technique is a differential encircling coil similar to the tooling that is mounted on the single rod visual stand in conventional inspection tools. Mounting the eddy current coil on the single rod inspection tool allows for obtaining eddy current and ultrasonic data while the rod is being removed from the assembly. If the results are satisfactory, the rod is immediately reinserted. If the results are not satisfactory or are suspect, the rod can be moved to the single rod visual stand for further investigation.

The single rod ultrasonic leak detection tool will be used to detect leaking fuel rods by evaluation if there is water inside the rod. The test will be performed by moving one fuel rod between two ultrasonic transducer oriented in a pitch/catch configuration. The tool can be mounted on existing fuel rod visual inspection tooling or mounted to the fuel rod handling tool. The ultrasonic transducer signal will be sent to a computer program for display and evaluation.

Unlike existing leak detection tools, the single rod leak detection tool design allows for measurement throughout the entire length of the rod as the rod is moved through the passage 50 past the probe. AFIS evaluates the rod at only a few elevations.

As stated, the preferred probes are ultrasonic transducers. Ultrasonic transducers are divided into three broad categories: transmitters, receivers and transceivers. Transmitters convert electrical signals into ultrasound, receivers convert ultrasound into electrical signals, and transceivers can both transmit and receive ultrasound.

In a similar way to radar and sonar, ultrasonic transducers are used to evaluate the condition of a fuel rod by interpreting the reflected signals. For example, by measuring the time between sending a signal and receiving an echo the distance of an object can be calculated.

The beam pattern of a transducer can be determined by the active transducer area and shape, the ultrasound wavelength, and the sound velocity of the propagation medium. A capacitor ("condenser") microphone has a thin diaphragm that responds to ultrasound waves. Changes in the electric field between the diaphragm and a closely spaced backing plate convert sound signals to electric currents, which can be amplified. Because ultrasonic sensors use sound rather than light for detection, they work in applications where photoelectric sensors may not. Passive ultrasonic sensors may be used to detect high-pressure gas or liquid leaks, or other hazardous conditions that generate ultrasonic sound.

In a typical ultrasonic transducer probe, there may be one or more quartz crystals called piezoelectric crystals. When an electric current is applied to these crystals, they change shape rapidly. The rapid shape changes, or vibrations, of the crystals produce sound waves that travel outward. Conversely, when sound or pressure waves hit the crystals, they emit electrical currents. Therefore, the same crystals can be used to send and receive sound waves. The probe may also have a sound absorbing substance to eliminate back reflections from the probe itself, and an acoustic lens to help focus the emitted sound waves. Transducer probes may contain one or more crystal elements; in multiple-element probes, each crystal has its own circuit. Multiple-element probes have the advantage that the ultrasound beam can be "steered" by changing the timing in which each element gets pulsed.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. An apparatus for detecting leaks in a fuel rod comprising:
 a tool body having an upper end and a lower end and defining a bore extending from the upper to the lower end, the bore having in cross-section, a center line and being dimensioned for receiving and passing a fuel rod therethrough;
 at least one set of probes positioned in the tool body about the bore, off-set a predetermined distance from the center line defined by the bore, wherein a first probe of the at least one set of probes is configured to transmit a signal and a second probe of the at least one set of probes is configured to receive the signal;
 an engagement surface for securing the lower end of the tool body to a surface;
 a fuel rod centering mechanism comprising a plurality of movable arms joined by at least one pivot joint, wherein each arm comprises a roller guide on a free end, wherein a spring is coupled to each arm and is configured to bias the apparatus against the fuel rod, thereby maintaining the central axis of the fuel rod in alignment with the plane of the center line of the bore; and
 a stationary roller on a stationary arm positioned on an opposite side of the fuel rod relative to the fuel rod centering mechanism, wherein the stationary roller is configured to provide a countering force to the fuel rod centering mechanism.

2. The apparatus recited in claim 1 wherein at least one probe of the at least one set of probes is an ultrasonic transducer.

3. The apparatus recited in claim 1 wherein the surface is a guide plate having a plurality of holes in a pattern aligning the holes with at least one section of fuel rods in a fuel rod assembly.

4. The apparatus recited in claim 1 wherein the surface is the surface of an existing tool platform to enable use of the apparatus with existing tools.

5. The apparatus recited in claim 4 further comprising a pair of pivot arms, one arm being mounted at a first end thereof to the upper end of the tool body and the other arm of the pair being mounted at a first end thereof to the lower end of the tool body, each arm having a second end having an opening therethrough;
 a bolt passing through the openings of the second ends of the pair of pivot arms, the bolt being mountable on an existing tool platform to pivot the apparatus into and out of a working position on the existing tool platform.

6. The apparatus recited in claim 1 comprising at least two sets of probes, wherein the first probe and the second probe belong to a first set of probes and are positioned on opposite sides of the center line of the bore, and wherein a third probe and a fourth probe belong to a second set of probes and are positioned on opposite sides of the center line of the bore.

7. The apparatus recited in claim 6 wherein the first set of probes is positioned at a different elevation along the length of the bore relative to the second set of probes.

8. The apparatus recited in claim 1 wherein the first probe and the second probe are positioned such that the first probe and the second probe do not physically contact the fuel rod.

* * * * *